United States Patent [19]

Terauchi et al.

[11] Patent Number: 5,054,332

[45] Date of Patent: Oct. 8, 1991

[54] ARTICULATED ROBOT

[75] Inventors: Tsuneo Terauchi; Takaaki Nishimura, both of Aichi, Japan

[73] Assignee: Mitsubishi Denki K.K., Tokyo, Japan

[21] Appl. No.: 354,314

[22] PCT Filed: Jul. 7, 1988

[86] PCT No.: PCT/JP88/00684

§ 371 Date: Mar. 6, 1989

§ 102(e) Date: Mar. 6, 1989

[87] PCT Pub. No.: WO89/00095

PCT Pub. Date: Jan. 12, 1989

[30] Foreign Application Priority Data

Jul. 7, 1987 [JP] Japan ............................ 62-167852

[51] Int. Cl.$^5$ .......................... B25J 17/00; F16H 1/10
[52] U.S. Cl. ........................................ 74/479; 74/640; 414/917; 901/21; 901/25
[58] Field of Search .................. 74/479, 640; 901/21, 901/25, 26; 414/917

[56] References Cited

U.S. PATENT DOCUMENTS

| | | | |
|---|---|---|---|
| 4,431,366 | 2/1984 | Inaba et al. | 414/735 |
| 4,492,510 | 1/1985 | Tanii et al. | 901/26 X |
| 4,557,662 | 12/1985 | Terhuchi et al. | 901/21 X |
| 4,682,932 | 7/1987 | Yoshino | 901/21 X |

FOREIGN PATENT DOCUMENTS

| | | |
|---|---|---|
| 0048905 | 9/1981 | European Pat. Off. . |
| 48-44948 | 12/1973 | Japan . |
| 57-61491 | 4/1982 | Japan . |
| 58-155197 | 9/1983 | Japan . |
| 58-181586 | 10/1983 | Japan . |
| 59-107896 | 6/1984 | Japan . |

Primary Examiner—Allan D. Herrmann
Attorney, Agent, or Firm—Sughrue, Mion, Zinn, Macpeak & Seas

[57] ABSTRACT

This invention relates to an articulated robot comprising at least two control arms (4), (7), and two speed reducers provided at articulated portions of the two control arms (4), (7) on the same axis in opposed relation to each other. The two speed reducers comprises first and second harmonic drive speed reducers which include a common circular spline (60) fixedly secured to the articulated portion of one of the control arms (4), (7), and a bracket (40), (50) mounted on one end of the common circular spline (60) for angular movement relative to the common circular spline (60) and connected to the articulated portion of the control arm (4), (7). The number of component parts can be reduced, the assembling operation can be facilitated, a stable high accuracy can be maintained, and an inexpensive articulated robot can be obtained.

6 Claims, 5 Drawing Sheets

ARTICULATED ROBOT

TECHNICAL FIELD

This invention relates to an articulated robot for extensive industrial use and more particularly to a drive mechanism for articulated portions of an articulated robot which comprises at least two control arms, and two speed reducers provided on the articulated portions of the two control arms on the same axis in opposed relation to each other.

BACKGROUND ART

One of conventional drive mechanisms for articulated portions of an articulated robot is disclosed, for example, in Japanese Laid-Open (Kokai) Patent Application No. 58-181586, and this will now be described with reference to the drawings. FIG. 1 is a front-elevational view of this conventional example, FIG. 2 is a side-elevational view thereof, and FIG. 3 is a detailed cross-sectional view of an articulation drive portion, indicated by a portion A in FIG. 1, for first and second arms serving as control arms. In these Figures, numeral (1) denotes a stationary base, numeral (2) a turntable turnable on the stationary base (2), numeral (3) a base fixedly mounted on the turntable (2), numeral (4) a first arm swingingly movable about a point (5) on the base (3), numeral (6) a first motor for driving the first arm (4), numeral (7) a second arm swingingly movable about a point (8) on the first arm (4), numerals (9) and (10) a link and a link support which cooperate with the first arm (4) and the second arm (7) to constitute a parallel link, numeral (11) a second motor for driving the second arm (7) through the link support (10) and the link (9), and numeral (12) a wrist mounted on a distal end of the second arm (7) for bending and twisting movements in directions indicated by arrows B and C.

Therefore, in this robot, the first arm (4) is swingingly moved forwardly and rearwardly by operating the first motor (6), and by operating the second motor (11), the link support (10) is swingingly moved upwardly and downwardly so that the second arm (7) is swingingly moved upwardly and downwardly about the center (8) of rotation through the parallel link mechanism comprising the first arm (4), the link (9) and the second arm (7). In other words, by controlling the first motor (6) and the second motor (11), the wrist (12) can be moved to an arbitrary point in a forwardly and, rearwardly extending- and upwardly and downwardly extending-plane defined by the first and second arms (4) and (7). Further, by adding the angular movement of the turntable (2), it can be moved to an arbitrary point in a space area including right and left directions, thus enabling various operations.

Next, in FIG. 3, numeral (15) denotes a first bracket fixedly secured to the base (3) and fixedly mounting the first motor (6) on the base (3) in a projecting manner. Numeral (16) denotes a first motor shaft which is an output shaft of the first motor (6). Numeral (18) denotes a first wave generator which cooperates with a first circular spline and a first flex spline later described to constitute a speed reducer commonly referred to as "harmonic drive component", and is fixedly mounted on the first motor shaft (16). Numeral (19) denotes the first circular spline fixedly mounted on the first bracket (15) coaxially with the first motor shaft (16). Numeral (20) denotes the first flex spline, and numeral (21) a first arm drive shaft, and numeral (22) a first bearing. The first arm drive shaft (21) is fixed to one side of the first arm (4), and the first bearing (22) supported by the first bracket (15) enables the first arm (4) to be swingingly moved about the same axis as that of the first motor shaft (16). The first flex spline (20) is disposed coaxially with the first circular spline (19), and is fixedly secured to the first arm drive shaft (21) at such a position that the teeth of these two splines are in mesh with each other. Numeral (23) denote a first bearing cover which holds the first bearing (22) within the first bracket (15).

Numeral (24) denotes a second bracket which is fixedly mounted on the base (3) at the side thereof opposite to the first bracket (15), with the first arm (4) interposed therebetween, the second bracket being fixed to the base (3) in such a manner that its inner periphery is disposed in coaxial relation to the first arm drive shaft (21) for the first arm 4. Numeral (25) denotes a second bearing which comprises a tapered roller bearing and is interposed between the second bracket and a sleeve-like shaft (26) fixed to the other side of the first arm (4) to support the first arm (4) in such a manner that the first arm is angularly movable relative to the second bracket (24). Numeral (27) denotes a second bearing cover which is threadedly engaged with a threaded portion (28) formed on the second bracket (24) to hold an inner ring of the second bearing (25) and also to apply a preload thereto. The second motor (11) and the first motor (6) are oppositely disposed on the same axis with respect to the first arm (4). Numeral (29) denotes a third bracket which is fixedly secured to the second bracket (24) and supports the second motor (11) in a projecting manner. Numeral (30) denotes a second motor shaft which is an output shaft of the second motor (11). Numeral (31) denotes a second wave generator fixedly mounted on the second motor shaft (30). Numeral (32) denotes a second circular spline which is fixedly mounted on the third bracket (29) coaxially with the second motor shaft (30). Numeral (33) denotes a second flex spline which is disposed coaxially with the second motor shaft (30) and cooperates with the second wave generator (31) and the second circular spline (32) to constitute a harmonic drive speed reducer. Numeral (34) denotes a second arm drive shaft, numeral (35) a third bearing, and numeral (36) a fourth bearing. The second arm drive shaft (34) is supported at opposite ends thereof by the first arm (4) through the third and fourth bearings (35) and (36), and at the intermediate portion thereof, the arm support (10) is swingingly movable about the same axis as that of the second motor shaft (30). The third and fourth bearings (35) and (36) comprises an angular contact ball bearing.

The operation will now be described.

When the first motor (6) is driven, the rotation of the first arm drive shaft (21) is reduced through the first harmonic drive speed reducer, so that the first arm (4) is swingingly moved about the axis of the first motor shaft (16). When the second motor (11) is driven, the rotation of the second arm drive shaft (34) is reduced through the second harmonic drive speed reducer, so that the link support (10) is swingingly moved about the axis of the second motor shaft (30). As mentioned above, the arm support (10) cooperates with the second arm (7), the first arm (4) and the link (9) to constitute the parallel link. Therefore, when the second motor (11) is driven, the second arm (7) is swingingly moved to operate the robot. In order to ensure the accuracy and rigidity of the robot, in the articulated portions shown in FIG. 3, the preload adjusting control is effected by a threaded adjustment of the bearing cover (27) and other means.

The drive mechanism for the articulated portions of the conventional articulated robot is constructed as described above, and therefore the number of the component parts is large, and besides in order to ensure the accuracy of the robot, it is necessary to enhance a machining precision of each component part. In addition, as mentioned above, the preload adjustment and so on are needed at the time of the assemblage. Therefore, it has been difficult to obtain robots of a high precision at low costs. Particularly, in the harmonic drive speed reducer, the arms are susceptible to vibration unless each component part is mounted on the same axis with high accuracy, and in the conventional example in which the number of the component parts is large, and a right and left-divided construction is used, a problem has been encountered that it is quite difficult to ensure a high accuracy assemblage in a stable manner.

The present invention has been made to overcome the above problems, and its object is to provide an articulated robot which can maintain a stable high accuracy without the need for adjustment by a skilled person at the time of the assemblage, and is inexpensive.

The articulated robot according to the present invention comprises at least two control arms, and two speed reducers provided at articulated portions of the two control arms on the same axis in opposed relation to each other, CHARACTERIZED in that the two speed reducers comprises first and second harmonic drive speed reducers which include a common circular spline fixedly secured to the articulated portion of one of the control arms, and a bracket mounted on one end of the common circular spline for angular movement relative to the common circular spline and connected to the articulated portion of the other control arm.

In a preferred embodiment of the invention, a cross roller bearing is interposed between the common circular spline and the bracket.

Further, in a preferred embodiment of the invention, the other bracket fixedly mounted on a base through a cross roller bearing is mounted on the other end of the common circular spline.

Further, in a preferred embodiment of the invention, the first and second harmonic drive speed reducers are constituted as a unit by the common circular spline, first and second flex splines disposed in the common circular spline on the same axis in opposed relation to each other and meshingly engaged with the common circular spline, first and second wave generators mounted respectively within the first and second flex splines on the same axis, first and second brackets respectively supporting shafts of said wave generators through bearings, and cross roller bearings each interposed between a respective one of the brackets and the circular spline.

Further, in a preferred embodiment of the invention, the shafts of the first and second wave generators are connected by respective toothed belt transmission mechanisms to output shafts of motors disposed rearwardly of or below the two control arms.

Further, in a preferred embodiment of the invention, brake devices are mounted on the shafts of the first and second wave generators, respectively.

BEST MODE FOR CARRYING OUT THE INVENTION

One embodiment of the present invention will now be described with reference to the drawings.

Figure 4:
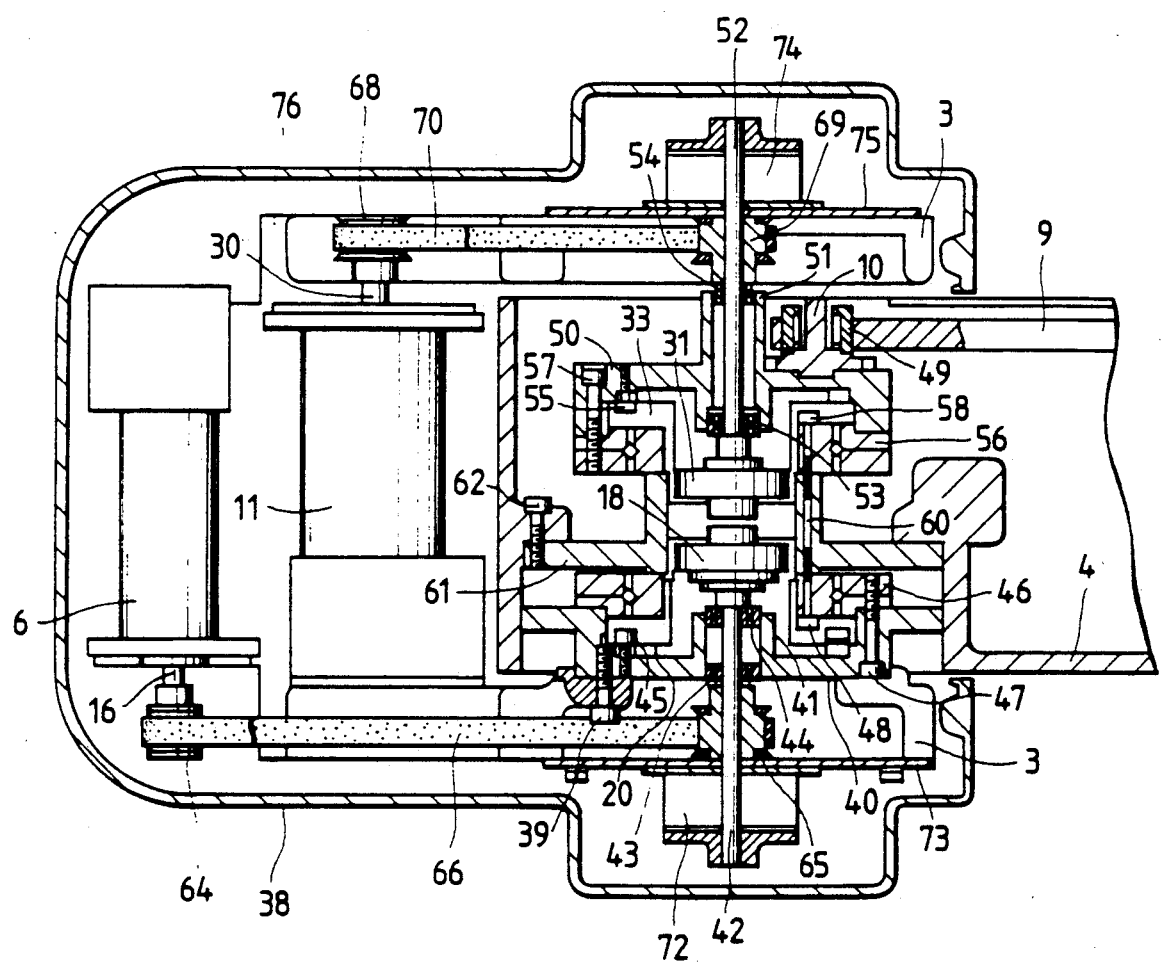
FIG. 4 is a cross-section view of articulated portions of an articulated robot embodying the present invention.
Figure 5:
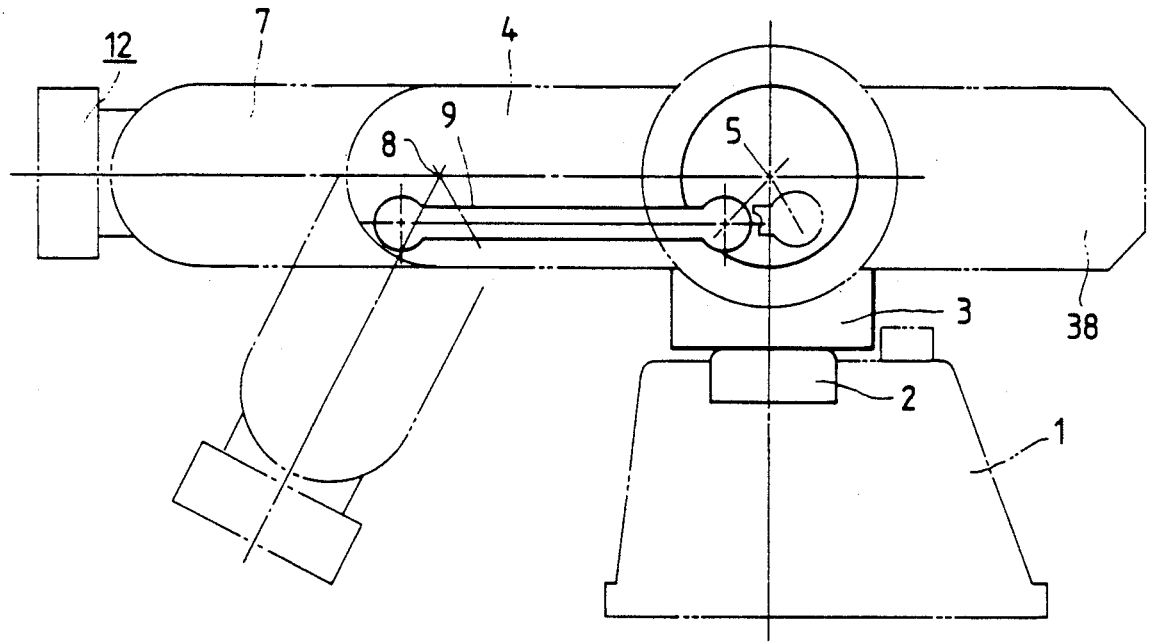
FIG. 5 is a view explanatory of the operation of a second arm.
Figure 6:
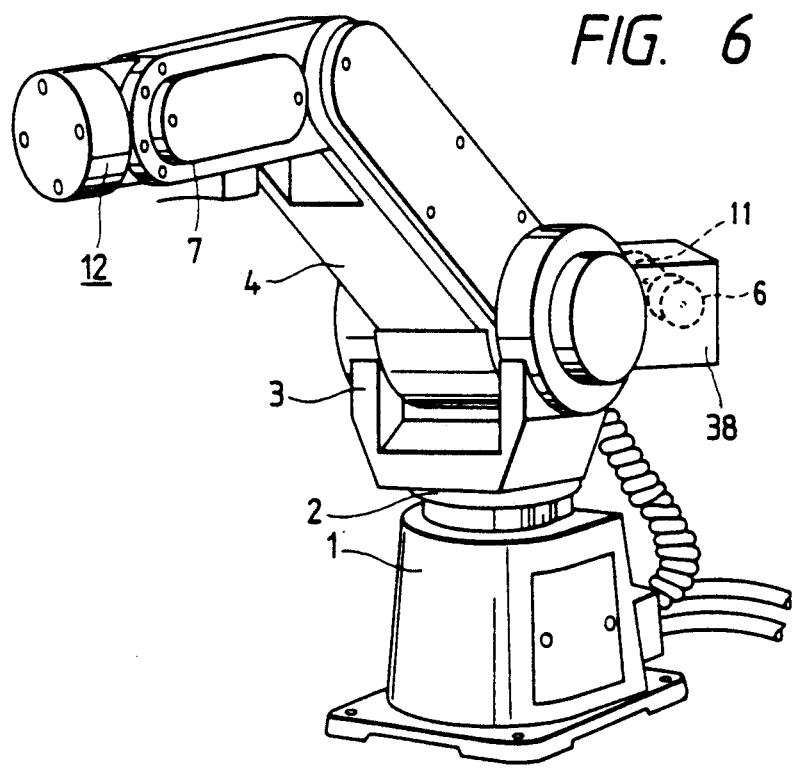
FIG. 6 is a view showing the appearance of the articulated robot.
Figure 7:
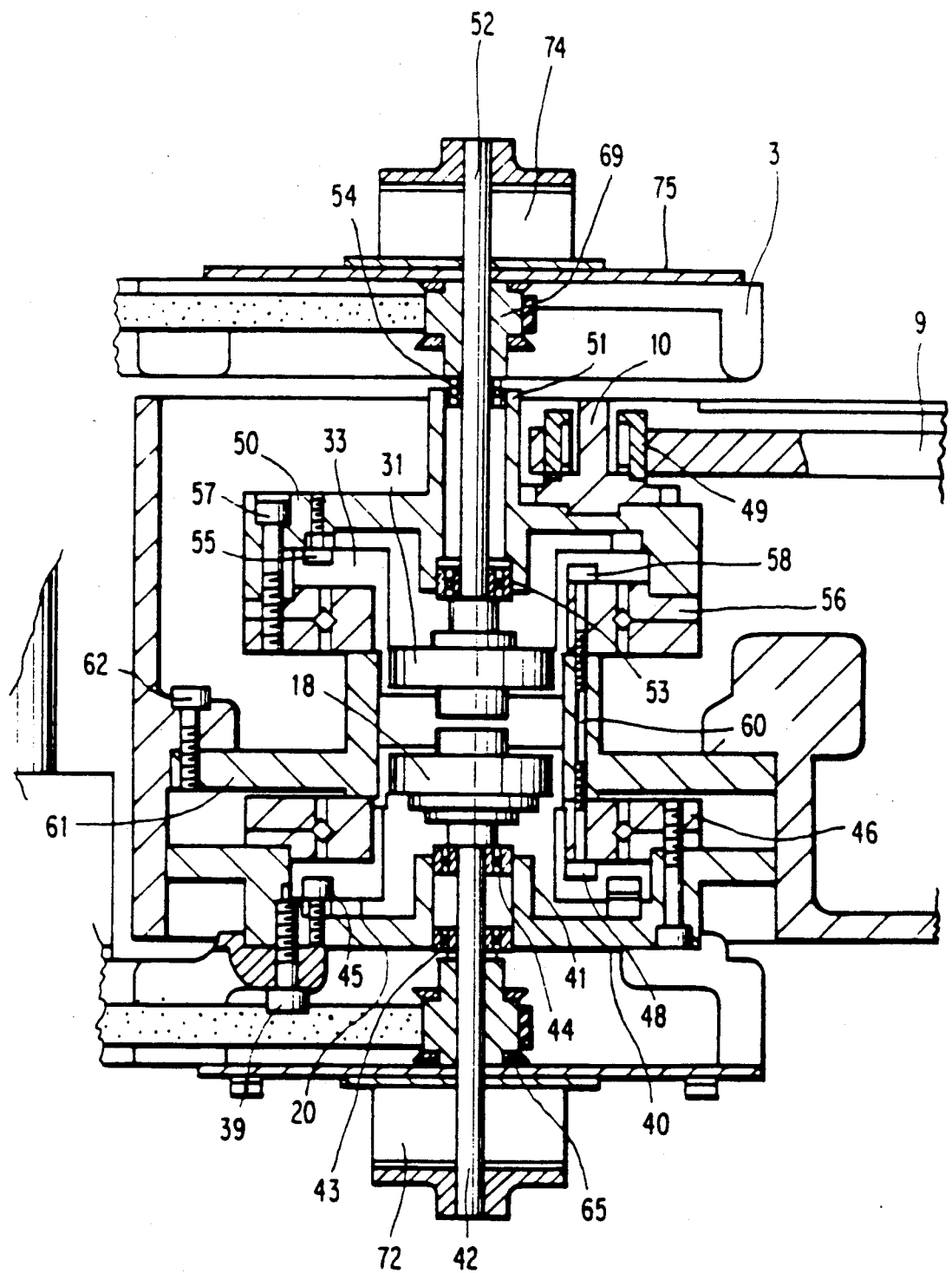
FIG. 7 is a blow-up view of the central portion of FIG. 4.

FIG. 4 is a cross-sectional view of the articulated portions of an articulated robot embodying the present invention. FIG. 5 is a view explanatory of the operation of a second arm. FIG. 6 is a view showing the appearance of the articulated robot. In these Figures, numerals (1) to (11), (12), (16), (18), (20), (30), (31) and (33) shows refer to parts corresponding to those of the conventional example. Numeral (38) denotes a cover which is split into an upper and a lower portion, and protects first and second motors (6) and (11), etc., contained therein, and provides an improved appearance.

Numeral (40) denotes first bracket of a recessed shape which has a sleeve (41) at its central portion and is fixedly mounted on a base (3) by bolts (39). Numeral (18) denotes a first wave generator which is fixedly secured to a distal end of a first wave generator shaft (42) which extends through the sleeve (41) supported by first bearings (43) and (44), the first wave generator cooperating with a first flex spline and a common circular spline later described to constitute a first harmonic drive speed reducer. Numeral 20 denotes the first flex spline which is in the shape of a top hat. The brim portion is fixedly mounted by bolts 45 within the recess of the first bracket (40) in coaxial relation to the first wave generator shaft (42). Numeral (46) denotes a first cross roller bearing, and its outer ring is fixedly secured to the inner end face of the first bracket (40) by bolts (47) while its inner ring is fixedly secured to one end face of the common circular spline by bolts (48). Numeral (50) denotes a second bracket which is rotatably mounted on the side opposite to the first bracket (40) and is angularly movable relative to the common circular spline. The second bracket (50) is generally similar in shape to the first bracket (40) and has a sleeve (51) at its central portion. A link support (10) of the pin type is mounted on the outer surface of the second bracket (50) in an eccentric manner and projects therefrom. A link (9) is pivotally connected at one end to the link support (10) through a roller follower (49). Numeral (31) denotes a second wave generator which is fixedly secured to a distal end of a second wave generator shaft (52) which extends through the sleeve (51) and is supported by second bearings (53) and (54), the second wave generator cooperating with a second flex spline later described and the common circular spline to constitute a second harmonic drive speed reducer. Numeral (33) denotes the second flex spline which is, like the first flex spline (20), in the shape of a top hat, and its brim portion is fixedly mounted by bolts (55) within the recess of the second bracket (50) in coaxial relation to the second wave generator shaft (52). Numeral (56) denotes a second cross roller bearing, and its outer ring is fixedly secured to the inner end face of the second bracket (50) by bolts (57) while its inner ring is fixedly secured to the other end face of the common circular spline by bolts (58) in symmetrical relation to the first cross roller bearing (46). Numeral (60) denotes the common circular spline which is one of the components of the first and second harmonic drive speed reducers and constitutes an important element of the present invention.

The circular spline (60) has teeth (splines) in its inner surface at opposite side portions thereof, and the first and second flex splines (20) and (33) are received in the circular spline, and disposed in coaxial, opposed relation to each other, and are in mesh with the above teeth, respectively. The common circular spline (60) has a flange (61) and is fixedly secured to a first arm (4) by bolts (62).

Therefore, the first arm (4) is supported by the first cross roller bearing (46) interposed between the common circular spline (60) and the first bracket (40) so as to be angularly movable relative to the base 3. The second bracket (50) is supported through the second cross roller bearing (56), the common circular spline (60) and the first cross roller bearing (46) so as to be angularly movable relative to the base (3). The above parts or elements (18), (20), (40) to (44), (50) to (54), (56) and (60) are all disposed in coaxial relation to one another and are so mounted that the circular spline (60) is disposed at a central portion.

Numerals (64), (65) denote first pulleys which are fixedly mounted respectively on a first motor shaft (16) and the first wave generator shaft (42) so that the rotation of the first motor (6) is transmitted to the first wave generator shaft (42) through a first belt (66). Numerals (68) and (69) denote second pulleys which are fixedly mounted respectively on a second motor shaft (30) and the second wave generator shaft (52) so that the rotation of the second motor (11) is transmitted to the second wave generator shaft (52) through a second belt (70). The above belts and pulleys constitute toothed belt transmission mechanisms, and the rotation of the motors can be positively transmitted without slip. Numeral (72) denotes a first brake, numeral (73) a first brake mounting plate, numeral (74) a second brake, and numeral (75) a second brake mounting plate. The first and second brake mounting plates (73) and (75) are both fixedly mounted on the base (3). The rotary sides of the first and second brakes (72) and (74) are mounted respectively to the first and second wave generator shafts (42) and (52) in coaxial relation, and the stationary sides thereof are fixedly secured to their respective brake mounting plates (73) and (75). Numeral (76) denotes a motor mounting plate fixedly mounted on the base (3), and the first and second motors (6) and (11) are mounted on this motor mounting plate. The link support (10) is different from the conventional one and is mounted on the second bracket (50) in eccentric relation to the axis of the articulated portion. The link support (10) and the roller follower (49) are also mounted on a rotation support flange (not shown) in a manner similar to the manner in which they are mounted on the second bracket (50), the link support and the roller follower cooperating with the second arm (7) and the first arm (4) to constitute a parallel link.

The operation of the above embodiment will now be described.

Figure 1:
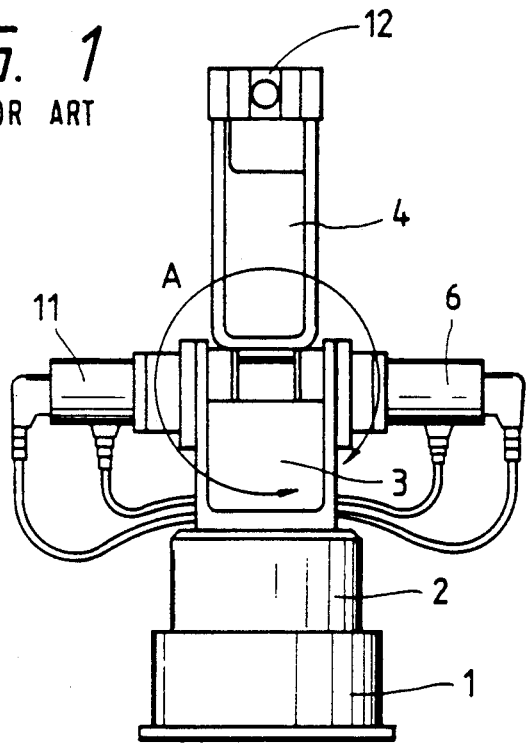
FIG. 1 is a front-elevational view of the conventional example.
Figure 2:
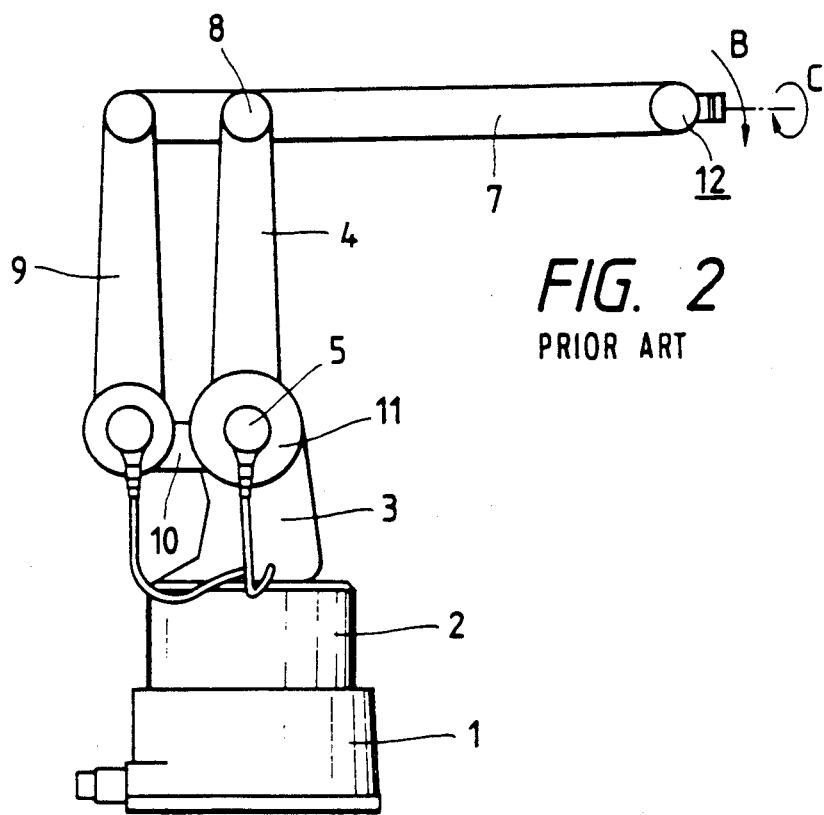
FIG. 2 is a side-elevational view thereof.
Figure 3:
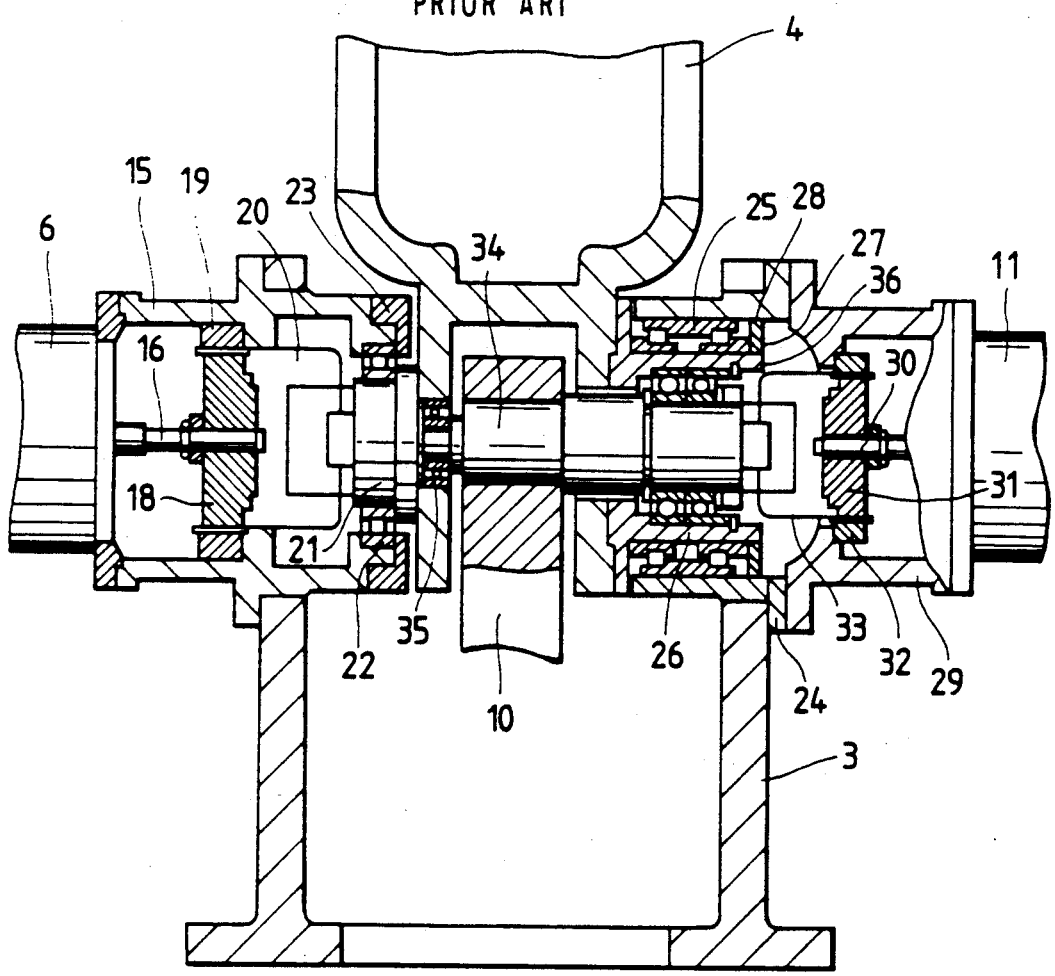
FIG. 3 is a cross-sectional view of an articulation drive portion indicated by a portion A in FIG. 1.

First, when the first motor (6) is driven, the rotation is transmitted to the first toothed pulley (64) mounted on the first motor shaft (16), and the rotation is further transmitted to the first driven pulley (65) through the toothed belt (66). Since the first pulley (65) is fixedly mounted on the first wave generator shaft (42), the first wave generator (18) is rotated, and through the speed reducing function of the first flex spline (20) and common circular spline (60), in this case, the circular spline (60) reduced in speed to effect a rotational motion relative to the base (3). As described above, since the circular spline (60) is angularly movably supported through the first bracket (40) and the first cross roller bearing (46) and is fixedly secured to the first arm (4), it can operate the first arm (4) by the driving of the first motor (6). In an articulated robot of the type in which the arms are vertically moved, as shown in FIG. 3, when the power source for the motor is turned off, the arms, in many cases, descend due to their own weight. The first brake (72) and the second brake (74) prevent the descending of the arms when the power source is turned off.

Next, the operation of the second arm (7) will be described. The driving of the second motor (11) is transmitted to the second driven pulley (69) through the second drive pulley (68) and the second belt (70) in a similar manner as described for the first arm (4), thereby rotating the second wave generator (31). For better understanding, assuming that the first arm (4) is not driven, it can be considered that the common circular spline (60) is integrally fixed to the base (3). More specifically, as a result of the rotation of the second wave generator (31), the second flex spline (33) angularly movably supported by the second cross roller bearing (56) is rotated at a reduced speed because of the function of the second harmonic drive speed reducer so that the integrally fixed second bracket (50) can be rotated. Since the second bracket (50) cooperates with the link support (10), the first arm (4) and the link (9) to constitute the parallel link, the second arm (7) angularly movably mounted on the distal end of the first arm (4) can be driven to thereby operate the robot.

In the articulation construction of the robot in which the harmonic drive speed reducers are disposed on the same axis as shown in FIG. 4, when the first bracket (40) is disconnected from the base (3) and the common circular spline (60) is disconnected from the first arm (4), this construction can be handled as an independent articulation unit having the same axis. Therefore, if there occurs a problem, the robot can be repaired in a quite short time by exchanging the whole of this unit. Further, in this articulation unit, the circular spline (60) is used as the common component of the two harmonic drives, and therefore spline cutting can be made with high precision at low cost. Further, as the first and second cross roller bearings (46) and (56) are subjected to set preloading as unit components, there is no need for adjustment at a time of the assemblage, and a high rigidity of the robot drive can be obtained.

In the above embodiment articulated portions having an integral circular spline (60) for the harmonic drive speed reducers have been described. Where the first motor (6) and the second motor (11) are disposed rearwardly of or below the first arm (4) of the robot as in the above embodiment, there is the advantage that the balance of the robot is improved at the time of the turning movement of the base (3). Further, although balance is better kept by arranging the first motor (6) and the second motor (11) rearwardly of or below the robot, the same effect can be achieved by mounting the motors coaxially with the wave generator shafts and driving the same, instead of using belt transmission mechanisms.

In the above embodiment, although no reference has been made to the numbers of the teeth of the splines on the opposite side portions of the common circular spline (60), it does not matter whether these numbers of the teeth are the same or different. Further, although the link support (10) is mounted on the second bracket (50) in eccentric relation, it may be of the arm type in which case one end thereof is fixedly secured to the sleeve (51) of the second bracket (50) in coaxial relation thereto.

Further, in the above embodiment, a vertical articulated robot has been described, but needless to say, similar effects can be achieved when the invention is applied to a horizontal articulated robot.

What is claimed is:

1. An articulated robot, comprising; at least two control arms, a pair of speed reducers provided at articulated portions of the two control arms and on the same axis in opposed relation to each other, said two speed reducers comprising first and second harmonic drive speed reducers which include a common circular spline fixedly secure to the articulated portion of one of the control arms, and a first bracket mounted on one end of said common circular spline for angular movement relative to said common circular spline and connected to the articulated portion of the other control arm.

2. An articulated robot according to claim 1, in which a cross roller bearing is interposed between the common circular spline and the first bracket.

3. An articulated robot according to claim 1, in which a second bracket fixedly mounted on a base through a cross roller bearing is mounted on the other end of the common circular spline.

4. An articulated robot according to claim 1, in which the first and second harmonic drive speed reducers comprise a single unit composed of the common circular spline, first and second flex splines disposed within the common circular spline on the same axis and in opposed relation to each other and meshingly engaged with the common circular spline, first and second wave generators mounted respectively within the first and second flex splines on the same axis, said first bracket and a second bracket respectively supporting shafts of said wave generators through bearings, and cross roller bearings each interposed between a respective one of the brackets and the circular spline.

5. An articulated robot according to claim 4, in which the shafts of the first and second wave generators are connected by respective toothed belt transmission mechanisms to output shafts of motors, at least one of which is disposed at least one of rearwardly of and below said two control arms.

6. An articulated robot according to claim 4, in which brake devices are mounted on the shafts of the first and second wave generators, respectively.

* * * * *